United States Patent [19]

Maruta

[11] Patent Number: 4,868,001

[45] Date of Patent: Sep. 19, 1989

[54] FEED FOR ANIMALS AND PROCESS FOR PRODUCING SAME

[76] Inventor: Kazumitsu Maruta, 8-5, 1-chome, Kishibekita, Suita-shi, Osaka-fu, Japan

[21] Appl. No.: 175,907

[22] Filed: Mar. 31, 1988

[51] Int. Cl.[4] .............................................. A23K 1/00
[52] U.S. Cl. .................................. 426/623; 426/520; 426/805; 426/807; 435/254; 514/560
[58] Field of Search ................. 426/520, 623, 72, 2, 426/807, 805; 514/560; 435/254

[56] References Cited

U.S. PATENT DOCUMENTS

| | | | |
|---|---|---|---|
| 4,281,064 | 7/1981 | Suzuki et al. | 435/254 |
| 4,642,317 | 2/1987 | Palmquist et al. | 514/560 |
| 4,738,853 | 4/1988 | Horrobin | 426/630 |
| 4,764,532 | 8/1988 | Corman et al. | 514/560 |

OTHER PUBLICATIONS

Suzuki "Cat Food Containing Mortierella Cells Rich in γ-Linolenic Acid", Chemical Abstracts vol. 105 (1986) Abstract No. 151858y.

Frobisher "Fundamentals of Microbiology", W. B. Saunders Co. Publishers 8th edition 1968 pp. 239–241.

*Primary Examiner*—R. B. Penland
*Attorney, Agent, or Firm*—Frishauf, Holtz, Goodman & Woodward

[57] ABSTRACT

A feed for animals containing heat-treated ω6-unsaturated fatty acid such as γ-linolenic acid, and production process for the same. Feed efficiency of the feed of the present invention is higher, and the feed improves health of the animals.

5 Claims, No Drawings

FEED FOR ANIMALS AND PROCESS FOR PRODUCING SAME

BACKGROUND OF THE INVENTION

The present invention relates to a feed for animals and process for producing same. In particular, the present invention relates to a feed for animals containing an ω 6-unsaturated fatty acid and process for producing same.

γ-Linolenic acid and arachidonic acid which are one of ω 6-unsaturated fatty acid, and bishomo-γ-linolenic acid produced in vivo from γ-linolenic acid and precursors for prostaglandin. Oils and fats containing γ-linolenic acid attract attention as healthy foods. As such oils and fats, vegetable oils extracted from seeds of evening primrose, etc. are used. However, such vegetable oils have problems in oxidation stability and heat stability and, therefore, these oils have not been used in a large amount. Though oils and fats containing γ-linolenic acid were extracted from some mold, the uses of them are limited, since the quality thereof is deteriorated by oxidation with air or thermal decomposition. Further, the use of ω 6-unsaturated fatty acids such as γ-linolenic acid could not be widely developed because they are expensive.

SUMMARY OF THE INVENTION

The inventor made investigations for the purpose of developing the use of ω 6-unsaturated fatty acid such as γ-linolenic acid and also a process for producing these fatty acids having improved oxidation stability and thermal stability at a low cost.

After the investigations, the inventor has found that the oils and fats and fatty acids containing γ-linolenic acid are stabilized by a heat treatment. Particularly, when a mold containing γ-linolenic acid, etc. is heat-treated, the oils and fats and fatty acids contained therein are stabilized and that by this process, the intended product can be fed at a cost lower than that of the conventional products. The inventor has found also that the product can be used as a feed for animals. The present invention has been completed on the basis of this finding.

DETAILED DESCRIPTION OF THE INVENTION

The present invention provides a feed for animals containing 0.0005 to 5.0 wt. % of an ω 6-unsaturated fatty acid, and a process for producing the feed.

The ω 6-unsaturated fatty acids usable in the present invention are preferably highly unsaturated fatty acids having at least two carbon-to-carbon double bonds such as 2,4-decadienoic acid, linolenic acid, γ-linolenic acid, 8,10,12-octadecatrienoic acid and arachidonic acid. Among them, γ-linolenic acid is particularly preferred.

Seeds of evening primrose, etc. and molds containing γ-linolenic acid, etc. are used as the sources of the ω 6-unsaturated fatty acids. Among them, the molds containing γ-linolenic acid, etc. are preferred, since they are available on the market stably at a low cost. The molds are those of Mortierella, Mucor, Cunninghamella, etc.

In the present invention, the mold is cultured in a nutrient culture medium by an ordinary method, then harvested and heat-treated. The heat treatment is conducted preferably in two steps. Namely, a pretreatment is conducted at 50 to 100° C., preferably 60° to 90° C., for 10 to 60 min., preferably 20 to 40 min. and then the main treatment is conducted at 100 to 150° C., preferably 120° to 130° C. to dry the product.

When the heat treatment is conducted in one step, thermal decomposition products of the residual components of the medium such as sugar and minerals are contained in the feed unfavorably.

Thus, it is desirable to wash the pretreated product with water to remove unnecessary substances prior to the main treatment. The product thus obtained after the heat treatment may be used as the ω 6-unsaturated fatty acid either as it is or after extraction with, for example, n-hexane, acetone or ethanol. The results of the analysis of the heat-treated mold (Mortierella isabellina) is shown in the following Table 1.

TABLE 1

| Component | Amount (%) |
|---|---|
| Components of *Mortierella isabellina* | |
| water | 5.0 |
| protein | 29.0 |
| lipid* | 28.0 |
| fiber | 1.2 |
| ash | 6.5 |
| glucoside | 30.3 |
| retinol | not detected |
| total carotenes | " |
| vitamin $B_1$ | 0.4 mg/100 g |
| vitamin $B_2$ | 2.2 mg/100 g |
| *Composition (*Mortierella isabellina*) | |
| myristic acid ($C_{14:0}$) | 0.7% |
| palmitic acid ($C_{16:0}$) | 26.2 |
| palmitooleic acid ($C_{16:1}$) | 0.8 |
| stearic acid ($C_{18:0}$) | 4.9 |
| oleic acid ($C_{18:1}$) | 43.2 |
| linoleic acid ($C_{18:2}$) | 12.4 |
| γ-linolenic acid (γ$C_{18:3}$) | 10.7 |
| arachic acid ($C_{20:2}$) | 0.4 |
| eicosenoic acid ($C_{20:1}$) | 0.3 |
| behenic acid ($C_{22:0}$) | 0.1 |
| erucic acid ($C_{22:1}$) | 0.2 |
| other fatty acids | 0.1 |

TABLE 2

| Amino acid | Amount (g/100 g) |
|---|---|
| Amino acids in *Mortierella isabellina* | |
| arginine | 1.33 |
| lysine | 1.83 |
| histidine | 0.61 |
| phenylalanine | 1.12 |
| tyrosine | 0.72 |
| leucine | 1.80 |
| isoleucine | 1.18 |
| methionine | 0.42 |
| valine | 1.31 |
| alanine | 1.55 |
| glycine | 0.98 |
| proline | 2.55 |
| glutamic acid | 2.38 |
| serine | 1.27 |
| threonine | 1.18 |
| aspartic acid | 2.38 |
| tryptophane | 0.33 |
| cystine | 0.28 |

When the seeds of, for example, evening primrose are used as the ω 6-unsaturated fatty acid source, the seeds are preferably directly roasted without pulverization thereof so as to keep the oils and fats therein. The roasting conditions are as follows:

(1) heating temperature: 120° to 350° C. (preferably 180° to 220° C.), (2) heating time: 1 to 30 min. (preferably 2 to 5 min.), and
(3) heating environment: ordinary heating environment (preferably roasting by means of far infrared rays in nitrogen stream).

The feed of the present invention for animals must contain 0.005 to 5.0 wt. %, preferably 0.001 to 1.0 wt. %, of an ω 6-unsaturated fatty acid such as γ-linolenic acid. When the amount of the unsaturated fatty acid is less than 0.0005 wt. %, the sufficient effect thereof cannot be obtained and, on the contrary, when it exceeds 5.0 wt. %, the coefficient of digestibility is reduced and a loose passage is caused. Further, such an excessive amount of the unsaturated fatty acid is economically disadvantageous.

The animals to which the feed of the present invention can be given are not limited. They include cattle and poultry such as cows, pigs and hens, pets such as dogs, cats and birds and cultivated fishes such as goldfishes and carp.

The feed of the present invention can be stored stably over a long period of time, since the ω 6-unsaturated fatty acids such as γ-linolenic acid have excellent oxidation stability and thermal stability. Further, the ω 6-unsaturated fatty acids are available at a low cost and, therefore, they can be used in a large amount as the material for the feed for animals.

The feed of the present invention exhibit remarkable effects of improving the health of the animals such as a reduction of troubles of the liver functions, increase of the body weight and/or improvement in the quality of the meats and reduction of the death rate. In addition, when it is given to the cattle or poultry, γ-linolenic acid, etc. contained in the feed is concentrated in the animal bodies and, as a result, the health of human beings can be improved when they take the milk, meats and eggs. In addition, the feed efficiency of the feed of the present invention is often higher than that of conventional feeds.

The following experimental example and examples will further illustrate the present invention.

EXPERIMENTAL EXAMPLE

The heat treatment conditions of the molds were investigated. The heat treatment is conducted preferably in two steps, i.e. pretreatment and the main treatment. The treatment conditions in the two steps were investigated.

(1) Pretreatment conditions:
(The untreated mold had an acid value of 1.6 thirty minutes after completion of the culture.)

| Treatment conditions | | Storage conditions | | |
| --- | --- | --- | --- | --- |
| Temperature (°C.) | Time (min.) | Temperature (°C.) | Time (hr) | Acid value |
| untreated | | 4 | 24 | 20.2 |
| " | | 20 | 4 | 9.1 |
| " | | 20 | 24 | 33.5 |
| 60 | 30 | 20 | 24 | 9.6 |
| 70 | 30 | 20 | 24 | 3.0 |
| 80 | 30 | 20 | 24 | 2.2 |

(2) Conditions of the main treatment:
It was found that the treatment can be conducted satisfactorily by washing the mold with water, then dispersing it in water and drying the dispersion by heating to 100° to 150° C., preferably 120° to 130° C.

The mold thus heat-treated was stored at 40° C. for a given period of time. The physical properties thereof are shown below.

| Storage period (month) | Oil content (%) | γ-Linolenic acid content (%) | Acid value |
| --- | --- | --- | --- |
| 0 | 26.2 | 9.6 | 2.4 |
| 1 | 25.8 | 9.5 | 2.2 |
| 3 | 26.3 | 9.5 | 3.0 |
| 5 | 25.7 | 9.3 | 3.2 |

EXAMPLE 1 AND COMPARATIVE EXAMPLE 1

Feeds having compositions shown in Table 3 were prepared. Each feed was given to five groups of domestic fowls, each group consisting of 15 domestic fowls, for 12 weeks. The number of eggs, components of the eggs and particularly the fatty acids in the egg yolk lecithin were examined. The results are shown in Table 4.

TABLE 3

| Component | Example 1 | Comparative Example 1 |
| --- | --- | --- |
| corn | 59.17% | 59.17% |
| soy bean cake | 25.0 | 25.0 |
| calcium carbonate | 9.0 | 9.0 |
| calcium phosphate | 1.0 | 1.0 |
| NaCl | 0.25 | 0.25 |
| methionine | 0.08 | 0.08 |
| vitamin mixture | 0.5 | 0.5 |
| animal fat (yellow grease) | — | 5.0 |
| heat-treated mold containing γ-linolenic acid* | 5.0 | — |

*The composition was the same as that shown in Table 1.

TABLE 4

| Item | Example 1 | Comparative Example 1 |
| --- | --- | --- |
| (1) Number of eggs per month | 27 | 20 |
| (2) Fatty acids in egg-yolk lecithin | | |
| linoleic acid (%) | 18.0 | — |
| α-linolenic acid (%) | 4.0 | 11.5 |
| γ-linolenic acid (%) | 15.0 | 0.1 |
| oleic acid (%) | 38.7 | 32.1 |
| stearic acid (%) | 4.0 | 12.5 |
| palmitic acid (%) | 20.3 | 42.3 |
| arachidonic acid (%) | — | 1.5 |
| other compounds having an alkyl group | + | + |

EXAMPLE 2 AND COMPARATIVE EXAMPLE 2

Feeds having compositions shown in Table 5 were prepared. Each feed was given to a group of 50 carp and a change of the body weight and feed efficiency were examined. The results are shown in Table 6. The weight increase rate and the feed efficiency in Table 6 were determined according to the following formulae:

$$\text{weight increase rate (\%)} = \frac{\text{(body weight after test)} - \text{(body weight before test)}}{\text{(body weight before test)}} \times 100$$

$$\text{feed efficiency (\%)} = \frac{\text{weight increase rate}}{\text{total amount of feed taken}} \times 100$$

TABLE 5

| Component | Example 2 | Comparative Example 2 |
|---|---|---|
| casein | 15% | 15% |
| sucrose | 77 | 77 |
| salts | 4 | 4 |
| vitamin mixture | 0.85 | 0.85 |
| choline chloride | 0.15 | 0.15 |
| heat-treated mold containing γ-linolenic acid* | 3 | — |
| starch | — | 3 |

*The composition was the same as that shown in Table 1.

TABLE 6

| Item | Example 2 | Comparative Example 2 |
|---|---|---|
| Average body weight (g) | | |
| initial | 184 | 183 |
| after 90 days | 606 | 598 |
| Weight increase rate (%) | 32.7 | 32.5 |
| Feed efficiency (%) | 76.6 | 74.2 |

It is apparent from Table 6 that the feed of Example 2 had a higher feed efficiency.

EXAMPLE 3 AND COMPARATIVE EXAMPLE 3

Feeds having a composition shown in Table 7 (semi-moist type having a water content of 25 %) were prepared and each was given to a group of 20 dogs (1.5 years old) in an amount of 250 g/day/dog for 6 weeks and the results were compared with each other. The results are shown in Table 7.

TABLE 7

| Component | Example 3 | Comparative Example 3 |
|---|---|---|
| Meat meal | 17.5% | 17.5% |
| Fish meal | 16.6 | 16.6 |
| Beer yeast | 0.1 | 0.1 |
| Soy beans | 5.8 | 5.8 |
| Flour | 2.5 | 2.5 |
| Heat-treated mold containing γ-linolenic acid* | 0.12 | — |
| Vegetable oil and fat | — | 0.12 |
| Carbohydrate | 30.8 | 30.8 |
| Animal oil and fat | 0.22 | 0.22 |
| Ashes | | |
| Calcium | 0.13 | 0.13 |
| Phosphorus | 0.07 | 0.07 |
| Sodium | 0.015 | 0.015 |
| Potassium | 0.025 | 0.025 |
| Iron | $4.0 \times 10^{-3}$ | $4.0 \times 10^{-3}$ |
| Vitamins | | |
| A | 833 IU | 833 IU |
| C | 0.01% | 0.01% |
| D | 83 IU | 83 IU |
| E | 6.6 IU | 6.6 IU |
| $B_1$ | $4.0 \times 10^{-4}$% | $4.0 \times 10^{-4}$% |
| Flavonoid | 0.08 | 0.08 |
| Chlorophyll | 0.05 | 0.05 |
| Results of raising | Falling out of hair was only slight and gloss of the coat of fur and tension of the skin were excellent | Falling out of hair was serious and gloss of the coat of fur and tension of the skin were poor |

*The composition was the same as that shown in Table 1.

EXAMPLE 4 AND COMPARATIVE EXAMPLE 4

Feeds having a composition shown in Table 8 were prepared and each was given to a group of 10 young pigs weighing 25 to 60 kg for 2 weeks. The body weight increase and coefficient of digestibility were examined. The results are shown in Table 9. The coefficient of digestibility was determined according to the following formula:

$$\text{Coefficient of digestibility (\%)} = \frac{\left(\begin{array}{c}\text{digestible components}\\ \text{in the feed sample}\end{array}\right) - \left(\begin{array}{c}\text{(digestible components}\\ \text{in the basic feed)} \times\\ \text{(rate of the amount of}\\ \text{the basic feed)}\end{array}\right)}{\text{(content of the feed sample)} \times \text{(rate of the amount of the feed sample)}} \times 100$$

TABLE 8

| Component | Example 4 | Comparative Example 4 |
|---|---|---|
| Yellow corn | 75.4% | 75.4% |
| Soy bean cake | 3.5 | 3.5 |
| Heat-treated mold containing γ-linolenic acid* | 4.0 | — |
| Bran | 15.0 | 15.0 |
| Tricalcium phosphate | 0.8 | 0.8 |
| Calcium carbonate | 0.8 | 0.8 |
| Common salt | 0.3% | 0.3% |
| Vitamin mixture | 0.1 | 0.1 |
| Mineral mixture | 0.1 | 0.1 |

*The composition was the same as that shown in Table 1.

TABLE 9

| Item | Example 4 | Comparative Example 4 |
|---|---|---|
| Average weight increase per day (g) | 808 | 772 |
| Coefficient of digestibility (%) | 89 | 85 |

EXAMPLE 5 AND COMPARATIVE EXAMPLE 5

Feeds having a composition shown in Table 10 were prepared and each was given to a group of 10 grown-up cows for one month. The fatty acid composition of the milk of the cows was examined to obtain the results shown in Table 11. It is apparent from Table 11 that when the feed of the present invention was given to the cows, the cows' milk contained an increase concentration of γ-linolenic acid.

TABLE 10

| Component | Example 5 | Comparative Example 5 |
|---|---|---|
| Yellow corn | 75% | 75% |
| Soy bean cake | 2 | 5.5 |
| Heat-treated mold containing γ-linolenic acid* | 5 | — |
| Bran | 15.5 | 17.0 |
| Tricalcium phosphate | 0.8 | 0.8 |
| Calcium carbonate | 0.8 | 0.8 |
| Common salt | 0.3 | 0.3 |
| Vitamin mixture | 0.1 | 0.1 |
| Mineral mixture | 0.1 | 0.1 |

*The composition was the same as that shown in Table 1.

TABLE 11

| Fatty acids in cow's milk | Example 5 | Comparative Example 5 |
|---|---|---|
| Myristic acid | 4.7% | 4.5% |
| Palmitic acid | 18.8 | 19.1 |
| Palmitooleic acid | 2.9 | 2.8 |

TABLE 11-continued

| Fatty acids in cow's milk | Example 5 | Comparative Example 5 |
|---|---|---|
| Stearic acid | 5.8 | 6.1 |
| Oleic acid | 36.0 | 36.2 |
| Linoleic acid | 21.1 | 21.5 |
| γ-Linolenic acid | 0.7 | 0.3 |
| α-Linolenic acid | 2.2 | 2.0 |
| Other fatty acids | 7.8 | 7.5 |

EXAMPLES 6 AND 7 AND COMPARATIVE EXAMPLE 6

0.3 wt. % (Example 6) or 0.5 wt. % (Example 7) of heat-treated mold containing γ-linolenic acid (the same as that shown in Table 3) was added to a basic feed having a composition shown in Table 12 to prepare a feed. The feed was given to a group of 5 laying hens for a given period of time. The strength and thickness of the egg shells were examined and further changes of the body weight and fat content of the liver of the hens were also examined. The results are shown in Table 13. It is apparent from Table 13 that in the group wherein γ-linolenic acid was used, the strength and thickness of the egg shells were increased, the body weight was increased, the fat content of the liver was reduced and the quality of the meat was improved.

TABLE 12

| Material | Amount (%) |
|---|---|
| Yellow corn | 63.55 |
| Soy bean cake | 19.0 |
| White fish meal | 6.0 |
| Alfalfa meal | 3.0 |
| Calcium carbonate | 6.0 |
| Dicalcium phosphate | 1.9 |
| Common salt | 0.3 |
| Vitamins A, D and E[1] | 0.1 |
| Vitamins B[2] | 0.1 |
| Trace minerals[3] | 0.05 |
| Total | 100.0 |

Notes
[1] 1 g of the product contained 10,000 IU of vitamin A, 2,000 IU of vitamin $D_3$ and 10 mg dl-tocopherol acetate.
[2] 1 kg of the product contained 2.0 g of thiamine nitrate, 10.0 g of riboflavin, 2.0 g of pyridoxine hydrochloride, 2.0 g of nicotin-amide, 4.35 g of calcium D-pantothenate, 138 g of choline chloride and 1.0 g of folic acid.
[3] 1 kg of the product contained 80 g of Mn, 6 g of Fe, 0.6 g of Cu, 50 g of Zn and 1 g of I.

TABLE 13

| Item | | Comparative Example 6 no γ-linolenic acid added *1 | Example 6 0.3% of heat-treated mold containing γ-linolenic acid added *2 | Example 7 0.5% of heat-treated mold containing γ-linolenic acid added *2 |
|---|---|---|---|---|
| Strength of egg shell (kg/cm²) | Initial stage | 3.74 | 3.52 | 3.60 |
| | After 4 weeks | 3.42 | 3.60 | 3.08 |
| | After 8 weeks | 3.20 | 3.56 | 3.56 |
| | After 12 weeks | 2.74 | 2.97 | 3.38 |
| Thickness of egg shell (mm) | Initial stage | 0.33 | 0.33 | 0.33 |
| | After 4 weeks | 0.32 | 0.32 | 0.32 |
| | After 8 weeks | 0.32 | 0.33 | 0.33 |
| | After 12 weeks | 0.32 | 0.32 | 0.35 |
| Change of body weight (g/hen) | Initial stage | 1624.5 | 1658.9 | 1622.8 |
| | After 12 weeks | 1765.0 | 1756.1 | 1726.4 |
| | Difference | 140.5 | 103.9 | 103.6 |
| Fat content of the liver | Weight of liver (g/hen) | 44.83 | 41.96 | 40.17 |
| | Crude fat content (%) | 9.0 | 6.4 | 6.5 |
| | Amount of fat in the liver (g/hen) | 4.0 | 2.7 | 2.6 |

*1: Only the basic feed as given.
*2: The composition was the same as that shown in Table 1.

What is claimed is:

1. A process of producing a feed supplement for animals consisting essentially of the following steps:
    heating a mold selected from the group consisting of genera of Mortierella, Mucor and Cunninghamella and having gamma-linolenic acid containing lipid in a first step at 50° C. to 100° C.;
    washing said mold which has been heated and;
    heating said washed mold in a second heating step to a temperature of 100° C. to 150° C. to provide a feed supplement having improved oxidation and thermal stability.

2. The process of claim 1 wherein said first heating step is at a temperature of 60° to 90° C. and said second heating step is at a temperature of from 120° to 130° C.

3. The process of claim 2 wherein said first heating step is carried out for 10 to 60 minutes.

4. The process of claim 2 wherein said first heating step is carried out for between 20 and 40 minutes.

5. The process of claim 1 wherein said first heating step is carried out for 10 to 60 minutes.

* * * * *